United States Patent [19]
Smith et al.

[11] Patent Number: 5,318,820
[45] Date of Patent: Jun. 7, 1994

[54] HTCC/LTCC USE OF MULTIPLE CERAMIC TAPES IN HIGH RATE PRODUCTION

[75] Inventors: Hal D. Smith, Rancho Palos Verdes; Dennis F. Elwell, San Clemente, both of Calif.

[73] Assignee: Hughes Aircraft Company, Los Angeles, Calif.

[21] Appl. No.: 951,649

[22] Filed: Sep. 24, 1992

[51] Int. Cl.⁵ .............................................. B32B 3/14
[52] U.S. Cl. ..................................... 428/77; 428/189
[58] Field of Search .................................. 428/77, 189

[56] References Cited

U.S. PATENT DOCUMENTS 3,829,356  8/1974  Rutt ........................................ 428/77

*Primary Examiner*—George F. Lesmes
*Assistant Examiner*—Chris Raimund
*Attorney, Agent, or Firm*—Leonard A. Alkov; W. K. Denson-Low

[57] ABSTRACT

An elongated composite tape structure including an elongated carrier, and a plurality of sinterable, thermally fusible tape strips of different characteristics disposed on the elongated carrier. Also disclosed is a reel-to-reel process wherein the composite tape structure as stored on a reel is incrementally processed by longitudinally feeding the tape structure through one or more processing stations at each of which the tape is driven in an indexed manner so that predetermined portions of the tape are processed at each station for substantially the length of the tape structure.

5 Claims, 2 Drawing Sheets

HTCC/LTCC USE OF MULTIPLE CERAMIC TAPES IN HIGH RATE PRODUCTION

BACKGROUND OF THE INVENTION

The subject invention is directed generally to sinterable tapes utilized in the fabrication of unitized multilayer circuit structures, and is directed more particularly to a multiple sinterable tape array that is useful for high rate production of unitized multilayer circuit structures.

Hybrid multilayer circuit structures, also known as hybrid microcircuits, implement the interconnection and packaging of discrete circuit devices, and generally include a unitized multilayer circuit structure formed from a plurality of integrally fused insulating layers (e.g., ceramic layers) having electrical circuit patterns disposed there-between. The electrical circuit patterns comprise, for example, metallizations and passive components such as resistors and capacitors, and can be formed by thick film screen printing processes. Electrical interconnection of the electrical circuit patterns between the different layers is achieved with vias or holes appropriately located and formed in the insulating layers and filled with appropriate via fill material, for example by thick film screen printing, whereby the via fill material is in contact with predetermined metallization traces between the layers that extend over or under the vias. The discrete circuit devices (e.g., integrated circuits) are commonly mounted on the top insulating layer so as not to be covered by another insulating layer or on an insulating layer having die cutouts formed thereon to provide cavities for the discrete devices. Passive components such as capacitors and resistors can be formed on the same layer that supports the discrete devices, for example, by thick film processes.

Unitized multilayer circuit structures are commonly made pursuant to co-fired technology wherein a unitized multilayer circuit module is made from layers of sinterable insulating material (comprising for example a ceramic material) known in the art as "green tape". Generally, each of the green tape layers of a particular module is cut to size (i.e., "blanked") from a larger sheet or strip of unfired green tape, punched and screen printed to include a predetermined pattern of vias, interconnecting conductive traces, and electrical components such as resistors and capacitors. The individual screen printed green tape layers for a module are then stacked in the required order, and laminated together using a chosen temperature and pressure. The laminated structure is then fired at an elevated temperature. Such co-fired technology has been implemented with low temperature co-fired ceramic (LTCC) as well as with high temperature co-fired ceramic (HTCC).

Examples of low temperature co-fired processing can be found in "Development of a Low Temperature Co-fired Multilayer Ceramic Technology," by William A. Vitriol et al., 1983 ISHM Proceedings, pages 593–598; "Processing and Reliability of Resistors Incorporated Within Low Temperature Co-fired Ceramic Structures," by Ramona G. Pond et al., 1986 ISHM Proceedings, pages 461–472; and "Low Temperature Co-Fireable Ceramics with Co-Fired Resistors," by H. T. Sawhill et al., 1986 ISHM Proceedings, pages 268–271.

Known techniques for blanking and collating have included the use of hand pick and place equipment and robotic equipment. Such equipment is slow and costly, and moreover can process only one hybrid module at a time.

SUMMARY OF THE INVENTION

It would therefore be an advantage to provide a sinterable tape structure that is useful in high rate production of unitized multilayer circuit structures.

The foregoing and other advantages are provided by the invention in an elongated tape structure that includes an elongated carrier, and a plurality of sinterable, thermally fusible tape strips of different characteristics disposed on the elongated carrier.

A further aspect of the invention is directed to a process for utilizing the composite tape structure in a reel-to-reel process wherein the composite tape structure as stored on a reel is incrementally processed by longitudinally feeding the tape structure through one or more processing stations at each of which the tape is driven in an indexed manner so that predetermined portions of the tape are processed at each station for substantially the length of the tape structure. The process includes the steps of forming via openings in the plurality of sinterable, thermally fusible tape strips, filling the via openings, printing conductor traces on the sinterable tape strips, blanking the tape strips into individual blanked sheets, collating and assembling the blanked sheets into respective modules, laminating the respective modules, and firing laminated modules at an appropriate temperature.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
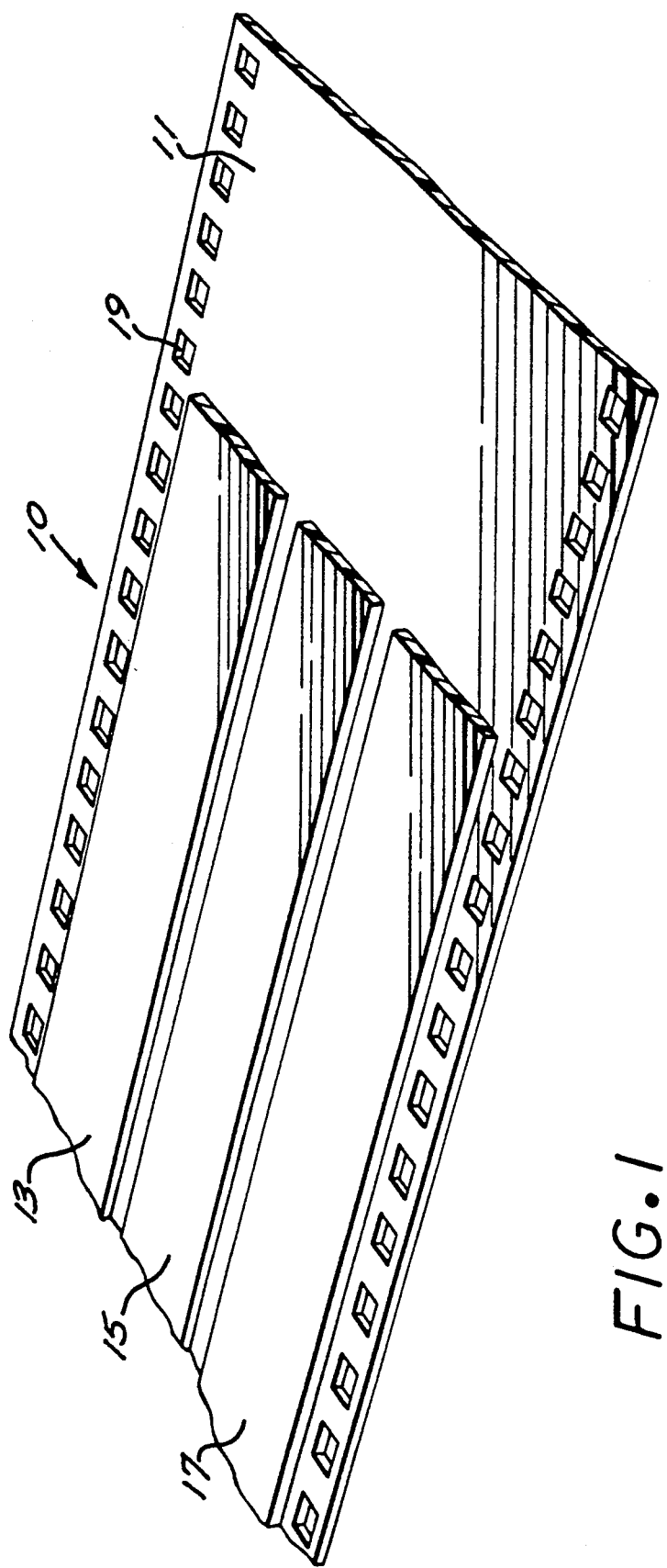
FIG. 1 is a schematic illustration of the composite sinterable tape structure in accordance with the invention.

In the following detailed description and in the several figures of the drawing, like elements are identified with like reference numerals.

Referring now to FIG. 1, schematically illustrated therein is a sinterable composite tape structure 10 that includes an elongated flexible carrier 11 having a constant width that supports a plurality of elongated parallel strips 13, 15, 17 of sinterable, thermally fusible tape which are located inwardly of guide holes 19 formed along the blank edges of the carrier 11. Each sinterable tape strip is of substantially constant width and separated from adjacent tape strips by small elongated gaps. It should be appreciated that the guide holes may be omitted for use of the tape structure with a suitable edge drive that grips the blank edges of the carrier.

The sinterable tape strips would be formed from different compounds having different respective characteristics, wherein one tape strip or ribbon can comprise a ceramic matrix tape, another comprises a dielectric tape (for use in making capacitors, for example), and still another comprises a ferrite tape (for induction enhancement). As a further example, a composite tape can have a ceramic tape and two dielectric tapes of different dielectric constants. A two strip composite tape can include a ceramic tape and a dielectric tape, or a ceramic and a ferrite tape, for example.

The plurality of tape strips 13, 15, 17 are formed from materials conventionally utilized for making sinterable tapes for use in making hybrid microcircuits, and can be cast pursuant to conventional sinterable tape casting techniques, except that a number of different compounds would be cast in longitudinal ribbons. The different sinterable tape compounds would be mechanically separated during casting and rolling operations so that at the conclusion of the tape casting operation the carrier film would have two or more ribbons releasably affixed thereto. Alternatively, previously cast tape strips of the desired types could be removed from respective carriers used during casting, and then mechanically affixed to respective positions on the carrier film 11.

The elongated tape structure 10 is advantageously utilized in reel-to-reel processing operations wherein a tape structure 10 as stored on a reel is incrementally processed by longitudinally feeding the tape structure through one or more processing stations whereby the tape is driven in an indexed manner at each station so that predetermined portions of the tape are processed at each station for substantially the length of the tape structure.

Figure 2:
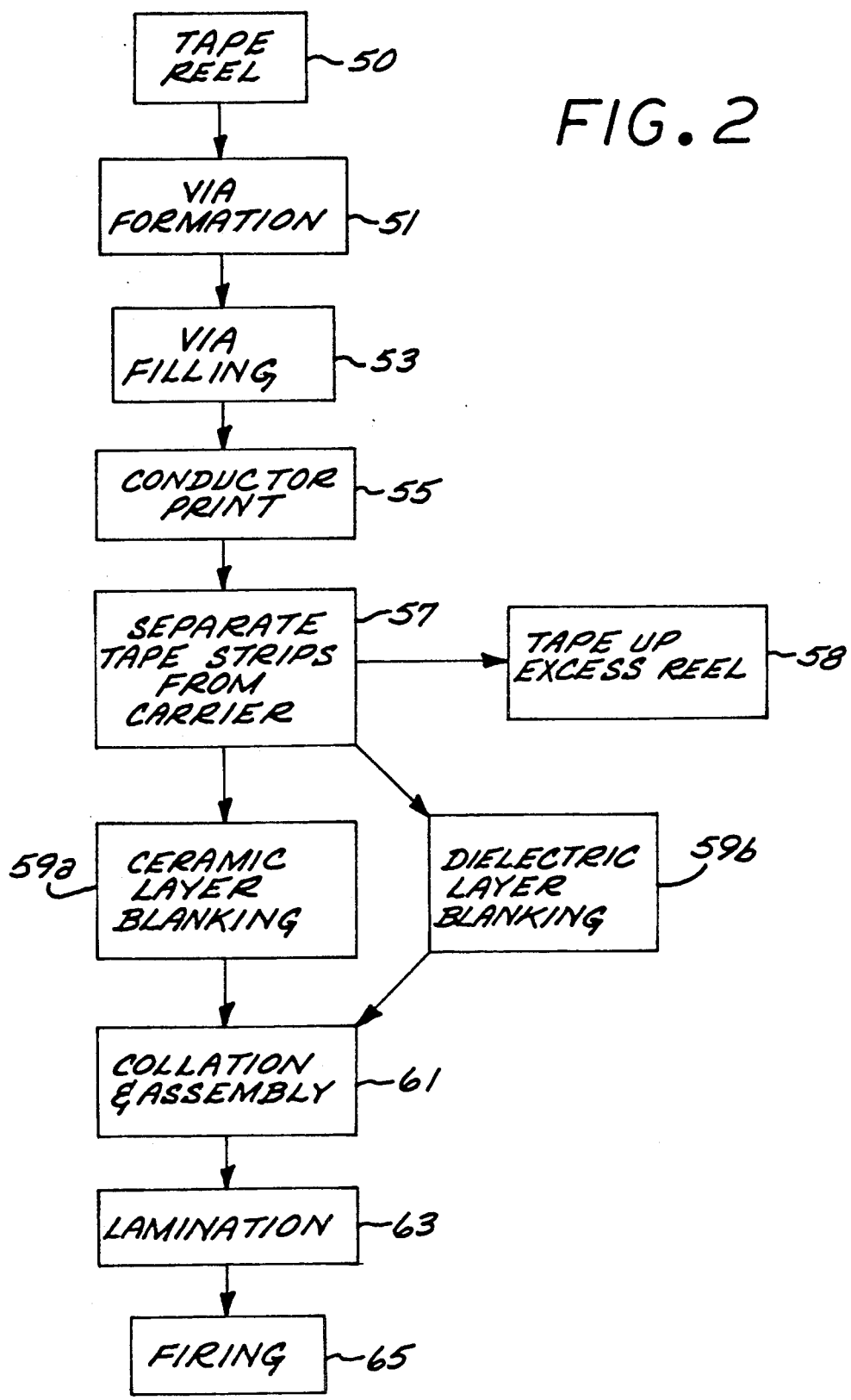
FIG. 2 is a block diagram representing a series of processing stations for utilizing the composite tape structure of FIG. 1 in the manufacture of unitized multilayer circuit structures.

FIG. 2 sets forth an illustrative example of a process flow for processing a composite tape structure as it is dispensed from a reel and longitudinally fed through a series of processing stations. At 51 the tape is subjected to formation of vias, and at 53 the vias are filled. At 55 conductor traces are printed, and at 57 the tape strips are removed from the carrier film. At 58 the carrier is collected on a take up reel, and at 59a and 59b the different tape strips, identified as ceramic matrix and dielectric by way of illustrative example, are blanked. The blanked tape sheets are collated and assembled into modules at 61, wherein a module can comprise different tape types. At 63 the assembled modules are respectively laminated pursuant to pressure and heat, for example, and at 65 the laminated modules are fired at an appropriate elevated temperature to drive off the organic solvents in the tape sheets and simultaneously fuse the sheets of each module.

The foregoing has been a disclosure of a composite tape structure that allows for high rate production of unitized multi-layer circuit structures with tape characteristic tailoring on a layer-by-layer basis, and with all layers for a given multilayer circuit structure remaining together as the tape proceeds along the production stations. This advantageously minimizes or eliminates the need for multiple stations to cope with different types of sinterable tapes, reduces the need for detailed control of individual layers, and reduces the effort required to collect all the layers of a given unitized multilayer circuit structure prior to lamination.

Although the foregoing has been a description and illustration of specific embodiments of the invention, various modifications and changes thereto can be made by persons skilled in the art without departing from the scope claims.

What is claimed is:

1. An elongated composite tape structure comprising: an elongated flexible carrier; and a plurality of sinterable, thermally fusible tape strips of different characteristics suitable for the manufacture of hybrid microcircuits disposed on said elongated carrier, wherein said plurality of sinterable tape strips comprises a ceramic tape and a dielectric tape.

2. The composite tape structure of claim 1 wherein the plurality of sinterable tape strips further includes a ferrite tape.

3. The composite tape structure of claim 1 wherein the plurality of sinterable tape strips includes a further dielectric tape.

4. An elongated composite tape structure comprising: an elongated flexible carrier; and a plurality of sinterable, thermally fusible tape strips of different characteristics suitable for the manufacture of hybrid microcircuits disposed on said elongated carrier, wherein said plurality of sinterable tape strips comprises a ceramic tape and a ferrite tape.

5. The composite tape structure of claim 4 wherein the plurality of sinterable tape strips further includes a dielectric tape.

* * * * *